US008108515B2

(12) United States Patent
Crawford et al.

(10) Patent No.: US 8,108,515 B2
(45) Date of Patent: *Jan. 31, 2012

(54) ENABLING RENT/BUY REDIRECTION IN INVITATION TO AN ONLINE SERVICE

(75) Inventors: Lee Crawford, Los Altos, CA (US); Clay Ver Valen, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/234,532

(22) Filed: Sep. 19, 2008

(65) Prior Publication Data

US 2009/0019154 A1 Jan. 15, 2009

Related U.S. Application Data

(63) Continuation of application No. 11/383,180, filed on May 12, 2006, now Pat. No. 7,587,502.

(60) Provisional application No. 60/681,085, filed on May 13, 2005.

(51) Int. Cl.
*G06F 15/173* (2006.01)
*A63F 9/24* (2006.01)

(52) U.S. Cl. .............................. 709/224; 705/52; 463/42

(58) Field of Classification Search .................. 709/224; 705/52; 463/42
See application file for complete search history.

(56) References Cited

U.S. PATENT DOCUMENTS

| | | | |
|---|---|---|---|
| 5,771,353 A * | 6/1998 | Eggleston et al. ............ | 709/227 |
| 6,005,943 A * | 12/1999 | Cohen et al. ................... | 380/30 |
| 6,009,458 A | 12/1999 | Hawkins et al. | |
| 6,466,969 B1 | 10/2002 | Bunney et al. | |
| 6,526,456 B1 * | 2/2003 | Allan et al. .................... | 719/328 |
| 6,699,125 B2 * | 3/2004 | Kirmse et al. .................. | 463/42 |
| 6,769,989 B2 | 8/2004 | Smith et al. | |
| 6,893,347 B1 * | 5/2005 | Zilliacus et al. ................ | 463/41 |
| 6,898,187 B2 | 5/2005 | Perlman et al. | |
| 6,908,389 B1 * | 6/2005 | Puskala .......................... | 463/40 |
| 6,978,933 B2 | 12/2005 | Yap et al. | |
| 7,043,530 B2 | 5/2006 | Isaacs et al. | |
| 7,056,217 B1 | 6/2006 | Pelkey et al. | |
| 7,133,368 B2 * | 11/2006 | Zhang et al. ................... | 370/249 |

(Continued)

OTHER PUBLICATIONS

US Patent and Trademark Office, Office communication mailed Sep. 23, 2008 for U.S. Appl. No. 11/383,180, 14 pages.

(Continued)

*Primary Examiner* — Alina N. Boutah
(74) *Attorney, Agent, or Firm* — Frommer Lawrence & Haug LLP; John W. Branch

(57) ABSTRACT

A system and method are directed towards enabling a user to access a client service such as a client game program that interacts with an online service such as a multiplayer game. A client probe detects execution of the client service on a first client device, and sends an instant message with address information to a second client device. A messaging service on the second client device, displays a presence of the first client and provides a selectable button to initiate the client service. If not already installed, the messaging service requests the client service from a remote online service such as a portal that may be independent from the online game service. The remote online service may provide options to freely try, rent, or buy the client service. The second client device downloads the client service and uses the address to connect to the same online multiplayer game.

23 Claims, 5 Drawing Sheets

U.S. PATENT DOCUMENTS

| | | | |
|---|---|---|---|
| 7,240,093 | B1 | 7/2007 | Danieli et al. |
| 7,288,028 | B2 | 10/2007 | Rodriquez et al. |
| 7,376,621 | B1 | 5/2008 | Ling |
| 7,376,696 | B2 | 5/2008 | Bell et al. |
| 7,391,854 | B2* | 6/2008 | Salonen et al. ............ 379/114.2 |
| 7,418,663 | B2 | 8/2008 | Pettinati et al. |
| 7,435,179 | B1 | 10/2008 | Ford |
| 7,517,282 | B1* | 4/2009 | Pryor .............................. 463/42 |
| 7,621,810 | B2* | 11/2009 | Gilmore et al. ................. 463/17 |
| 7,634,558 | B1* | 12/2009 | Mangal et al. ................ 709/224 |
| 7,680,038 | B1* | 3/2010 | Gourlay ........................ 370/230 |
| 7,853,996 | B1* | 12/2010 | Ormazabal .................... 726/11 |
| 2003/0056002 | A1* | 3/2003 | Trethewey .................... 709/238 |
| 2003/0105820 | A1 | 6/2003 | Haims et al. |
| 2003/0152034 | A1* | 8/2003 | Zhang et al. .................. 370/252 |
| 2004/0128250 | A1* | 7/2004 | Fox et al. ........................ 705/52 |
| 2004/0128252 | A1 | 7/2004 | Shirai et al. |
| 2004/0138910 | A1 | 7/2004 | Matsuno et al. |
| 2004/0203437 | A1 | 10/2004 | Burch et al. |
| 2004/0205473 | A1* | 10/2004 | Fisher et al. .................. 715/500 |
| 2004/0235567 | A1 | 11/2004 | Chatani |
| 2005/0091164 | A1 | 4/2005 | Varble |
| 2005/0097007 | A1 | 5/2005 | Alger et al. |
| 2005/0181878 | A1* | 8/2005 | Danieli et al. .................. 463/42 |
| 2005/0233797 | A1* | 10/2005 | Gilmore et al. ................. 463/17 |
| 2005/0262237 | A1* | 11/2005 | Fulton et al. .................. 709/224 |
| 2005/0273439 | A1 | 12/2005 | Yen et al. |
| 2005/0286519 | A1* | 12/2005 | Ravikumar et al. ........... 370/389 |
| 2005/0288101 | A1 | 12/2005 | Lockton et al. |
| 2006/0025216 | A1 | 2/2006 | Smith |
| 2006/0036549 | A1 | 2/2006 | Wu |
| 2006/0136584 | A1* | 6/2006 | Decker et al. ................. 709/224 |
| 2006/0178216 | A1 | 8/2006 | Shea et al. |
| 2006/0189381 | A1* | 8/2006 | Daniel et al. .................... 463/29 |
| 2006/0247038 | A1* | 11/2006 | Bamberger et al. ............. 463/29 |
| 2006/0258461 | A1 | 11/2006 | Bekman et al. |
| 2007/0041532 | A1* | 2/2007 | Salonen et al. ............ 379/114.2 |
| 2007/0165629 | A1* | 7/2007 | Chaturvedi et al. ........... 370/389 |
| 2008/0125226 | A1* | 5/2008 | Emmerson ..................... 463/42 |

OTHER PUBLICATIONS

US Patent and Trademark Office, Notice of Allowance and Fees Due mailed Apr. 20, 2009 for U.S. Appl. No. 11/383,180, 15 pages.

US Patent and Trademark Office, Office communication mailed Jun. 25, 2009 for U.S. Appl. No. 11/383,180, 5 pages.

Official Communication for U.S. Appl. No. 11/383,184, mailed Dec. 23, 2008.

Official Communication for U.S. Appl. No. 11/383,184, mailed Jul. 16, 2009.

Official Communication for U.S. Appl. No. 11/383,184, mailed Sep. 25, 2009.

Official Communication for U.S. Appl. No. 11/383,184, mailed Dec. 1, 2009.

Official Communication for U.S. Appl. No. 11/383,184, mailed May 20, 2010.

Official Communication for U.S. Appl. No. 11/383,184, mailed Aug. 16, 2010.

International Search Report and Written Opinion for International Patent Application No. PCT/US2006/018647, mailed Jul. 14, 2008.

International Preliminary Report on Patentability for International Patent Application No. PCT/US2006/018647, mailed May 7, 2009.

Official Communication for U.S. Appl. No. 11/383,179 mailed Sep. 22, 2008.

Official Communication for U.S. Appl. No. 11/383,179 mailed Oct. 8, 2008.

Official Communication for U.S. Appl. No. 11/383,179 mailed Apr. 8, 2009.

Official Communication for U.S. Appl. No. 11/383,179 mailed Jun. 9, 2009.

Official Communication for U.S. Appl. No. 11/383,179 mailed Sep. 3, 2009.

Official Communication for U.S. Appl. No. 11/383,179 mailed Apr. 6, 2010.

Official Communication for U.S. Appl. No. 11/383,179 mailed Jun. 15, 2010.

Official Communication for U.S. Appl. No. 11/383,179 mailed Aug. 4, 2010.

Official Communication for U.S. Appl. No. 11/383,179 mailed Dec. 15, 2010.

Official Communication for U.S. Appl. No. 11/383,179 mailed Feb. 24, 2011.

Office Communication for U.S. Appl. No. 11/383,179 mailed Jul. 1, 2011.

* cited by examiner

ENABLING RENT/BUY REDIRECTION IN INVITATION TO AN ONLINE SERVICE

CROSS-REFERENCE TO RELATED APPLICATIONS

This application is a Continuation of, and claims the benefit of U.S. patent application Ser. No. 11/383,180, filed on May 12, 2006, which is a Non-Provisional of Provisional (35 USC 119(e)) U.S. Patent Application No. 60/681,085 filed on May 13, 2005, both of which are incorporated herein by reference.

FIELD OF ART

The present invention relates generally to multi-person online services, and more particularly, but not exclusively, to enabling a user to access a client program through an indication from another client that is participating in the online service.

BACKGROUND

Online multiplayer games and other collaboration services have become increasingly popular as network communications have improved. Users who may be geographically distant from each other may communicate with an online service to participate together in games and/or other collaboration services. Typically, users run a client program that performs local processing and communicates with the online service to coordinate joint state of the multi-user game or service. For users to initiate participation in the same online game or online service, users may meet in an online lobby or other matching system that is associated with the online game or online service. However, if a person is not already communicating with the same lobby, or already participating in the same online service, the person may not be aware that a friend or colleague is participating. The friend or colleague can manually telephone the person or send a message with an identifier to invite the person to participate in the same online game or service. To reach people outside of the online game service, a message is typically sent through an independent messaging service, such as an online portal email service or instant message service, which is generally not limited to registered users of the online game service. However, this out-of-band messaging may be time consuming to find contact information and may distract from a current game session or other service session.

The other users that are contacted may not have the client program needed to participate in the online service. In that case, the other users typically access the online service independently to obtain the client program. Typically, the other users obtain a permanent copy of the client program, which may be costly, and may not be desired for permanent use. Sometimes, the other users can obtain a limited-capability client program that may not be able to join the same online session as the friend or colleague who informed the other users of the online service. Also, once the client program is installed, the other users may be required to search for the friend or colleague to join the same online session, or use the out-of-band communication to obtain address information from the friend or colleague to join the same online session.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION OF EMBODIMENTS

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely software embodiment, an entirely hardware embodiment or an embodiment combining software and hardware aspects. The following detailed description is, therefore, not to be taken in a limiting sense. Briefly stated, the present invention is directed towards detecting execution of a program on a client and notifying other related clients that wish to interact with the first client. Although the invention is not so limited, an exemplary embodiment is described below in terms of a client executing a game program to participate in an online game system, and informing other clients through an instant message system that is not directly associated with the online game system.

Illustrative Operating Environment

Figure 1:
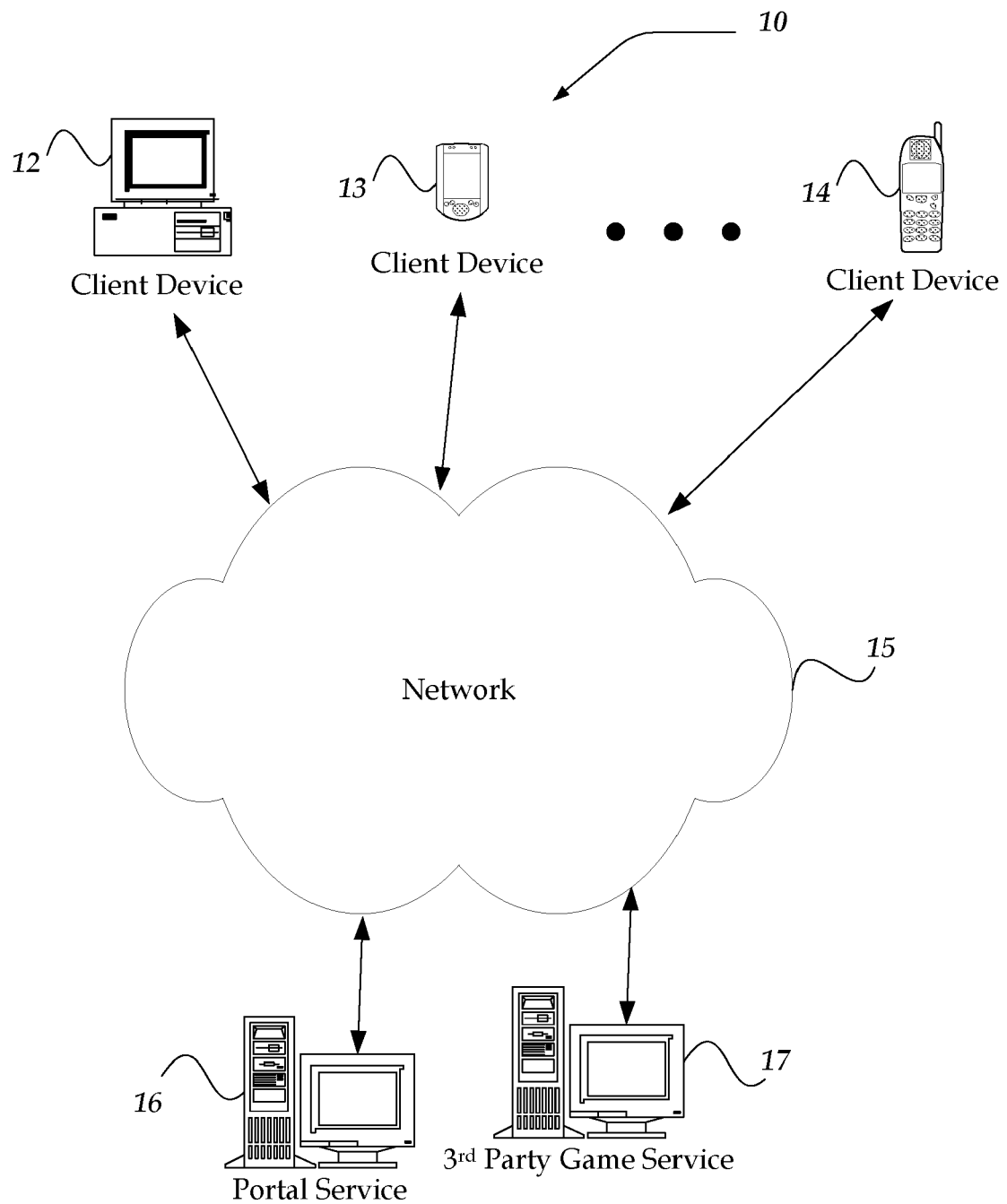
FIG. 1 shows a functional block diagram illustrating one embodiment of an environment for practicing the invention.

FIG. 1 illustrates one embodiment of an environment in which the present invention may operate. However, not all of these components may be required to practice the invention, and variations in the arrangement and type of the components may be made without departing from the spirit or scope of the invention.

As shown in the figure, a system 10 includes client devices 12-14, a network 15, a portal service 16, and a third party game service 17 that is not directly associated with the portal service. Network 15 is in communication with and enables communication between each of client devices 12-14, portal service 16, and game service 17.

Client devices 12-14 may include virtually any computing device capable of receiving and sending a message over a network, such as network 15, to and from another computing device, such as portal service 16, each other, and the like. The set of such devices may include mobile terminals that are usually considered more specialized devices and typically connect using a wireless communications medium such as cell phones, smart phones, pagers, walkie talkies, radio frequency (RF) devices, infrared (IR) devices, CBs, integrated devices combining one or more of the preceding devices, or virtually any mobile device, and the like. The set of such devices may also include devices that are usually considered more general purpose devices and typically connect using a wired communications medium such as personal computers, multiprocessor systems, microprocessor-based or programmable consumer electronics, network PCs, and the like. Similarly, client devices 12-14 may be any device that is capable of connecting using a wired or wireless communication medium such as a personal digital assistant (PDA), POCKET PC, wearable computer, and any other device that is equipped to communicate over a wired and/or wireless communication medium.

Each client device within client devices 12-14 includes a user interface that enables a user to control settings, such as presence settings, and to instruct the client device to perform operations. Each client device also includes a communication interface that enables the client device to send and receive messages from another computing device employing the same or a different communication mode, including, but not limited to instant messaging (IM), email, short message service (SMS) messaging, multi-media message service (MMS) messaging, internet relay chat (IRC), Mardam-Bey's internet relay chat (mIRC), Jabber, and the like. Client devices 12-14 may be further configured with a browser application that is configured to receive and to send web pages, web-based messages, and the like. The browser application may be configured to receive and display graphics, text, multimedia, and the like, employing virtually any web based language, including, but not limited to Standard Generalized Markup Language (SGML), HyperText Markup Language (HTML), Extensible Markup Language (XML), a wireless application protocol (WAP), a Handheld Device Markup Language (HDML), such as Wireless Markup Language (WML), WMLScript, JavaScript, and the like.

Network 15 is configured to couple one computing device to another computing device to enable them to communicate. Network 15 is enabled to employ any form of medium for communicating information from one electronic device to another. Also, network 15 may include a wireless interface, such as a cellular network interface, and/or a wired interface, such as an Internet interface, in addition to an interface to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize cellular telephone signals over air, analog telephone lines, full or fractional dedicated digital lines including T1, T2, T3, and T4, Integrated Services Digital Networks (ISDNs), Digital Subscriber Lines (DSLs), wireless links including satellite links, or other communications links that are equivalent and/or known to those skilled in the art. Furthermore, remote computers and other related electronic devices could be remotely connected to either LANs or WANs via a modem and temporary telephone link. In essence, network 15 includes any communication method by which information may travel between client devices 12-14, portal service 16, and/or game service 17. Network 15 is constructed for use with various communication protocols including transmission control protocol/internet protocol (TCP/IP), WAP, code division multiple access (CDMA), global system for mobile communications (GSM), and the like.

The media used to transmit information in communication links as described above generally includes any media that can be accessed by a computing device. Computer-readable media may include computer storage media, wired and wireless communication media, or any combination thereof. Additionally, computer-readable media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wireless media such as acoustic, RF, infrared, and other wireless media, and wired media such as twisted pair, coaxial cable, fiber optics, wave guides, and other wired media.

One embodiment of a general purpose client computing device, such as a client device 20, is described in more detail below in conjunction with FIG. 2. Briefly, client device 20 may include any computing device capable of connecting to network 15 to enable a user to communicate with other client devices, portal server 16, and/or game service 17. Client device 20 may include many more components than those shown. The components shown, however, are sufficient to disclose an illustrative embodiment for practicing the invention. Many of the components of client device 20 may also be duplicated in a server of portal service 16, a server of game service 17, and/or other server devices.

As shown in the figure, client device 20 includes a processing unit 22 in communication with a mass memory 24 via a bus 23. Mass memory 24 generally includes a RAM 26, a ROM 28, and other storage means. Mass memory 24 illustrates a type of computer-readable media, namely computer storage media. Computer storage media may include volatile and nonvolatile, removable and non-removable media implemented in any method or technology for storage of information such as computer readable instructions, data structures, program modules or other data. Other examples of computer storage media include EEPROM, flash memory or other semiconductor memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

Mass memory 24 stores a basic input/output system ("BIOS") 30 for controlling low-level operation of client device 20. The mass memory also stores an operating system 31 for controlling the operation of client device 20. It will be appreciated that this component may include a general purpose operating system such as a version of Windows™, UNIX, LINUX™, or the like. The operating system may also include, or interface with a virtual machine module that enables control of hardware components and/or operating system operations via application programs.

Mass memory 24 further includes one or more data storage units 32, which can be utilized by client device 20 to store, among other things, programs 34 and/or other data. Programs 34 may include computer executable instructions which can be executed by client device 20 to implement an HTTP handler application for transmitting, receiving and otherwise processing HTTP communications. Similarly, programs 34 can include an HTTPS handler application for handling secure connections, such as initiating communication with an external application in a secure fashion. Other examples of application programs include schedulers, calendars, web services, transcoders, database programs, word processing programs, spreadsheet programs, and so forth. Accordingly, programs 34 can process web pages, audio, video, and enable telecommunication with another user of another electronic device.

In addition, mass memory 24 stores one or more programs for messaging, gaming and/or other applications. A messaging client module 36 may include computer executable instructions, which may be run under control of operating system 31 to enable instant messaging, SMS, e-mail, and/or other messaging services. Similarly, a server device configured much like client device 20 (and/or client device 20 itself) may include a messaging server module 37, which provides routing, access control, and/or other server-side messaging services. Client device 20 may further include a game 38, which interacts with a game service to enable client device 20 to participate in an online game. A game probe 39 may further detect execution of game 38 and notify other clients through messaging client 36 and/or messaging server 37.

Figure 2:
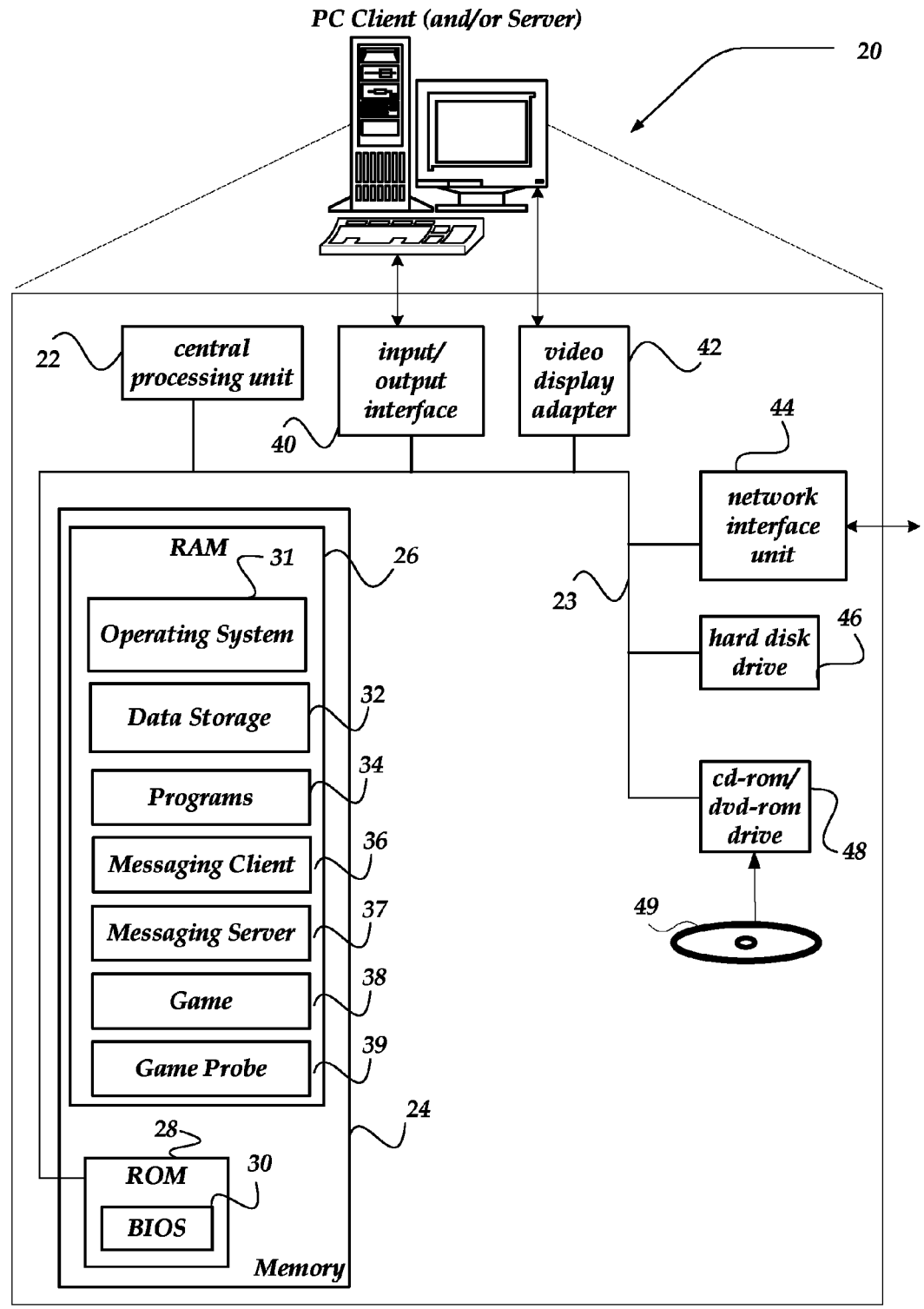
FIG. 2 shows one embodiment of a client and/or server device that may be included in a system implementing the invention.

Client device 20 also includes an input/output interface 40 for communicating with input/output devices such as a keyboard, mouse, wheel, joy stick, rocker switches, keypad, printer, scanner, and/or other input devices not specifically shown in FIG. 2. A user of client device 20 can use input/output devices to interact with a user interface that may be separate or integrated with operating system 31 and/or programs 34-39. Interaction with the user interface includes visual interaction via a display, and a video display adapter 42.

For higher capability client devices such as a personal computer, client device 20 may include a removable media drive 44 and/or a permanent media drive 46 for computer-readable storage media. Removable media drive 44 can comprise one or more of an optical disc drive, a floppy disk drive, and/or a tape drive. Permanent or removable storage media may include volatile, nonvolatile, removable, and non-removable media implemented in any method or technology for storage of information, such as computer readable instructions, data structures, program modules, or other data. Examples of computer storage media include a CD-ROM 49, digital versatile disks (DVD) or other optical storage, magnetic cassettes, magnetic tape, magnetic disk storage or other magnetic storage devices, RAM, ROM, EEPROM, flash memory or other memory technology, or any other medium which can be used to store the desired information and which can be accessed by a computing device.

Via a network communication interface unit 44, client device 20 can communicate with a wide area network such as the Internet, a local area network, a wired telephone network, a cellular telephone network, or some other communications network, such as network 15 in FIG. 1. Network communication interface unit 44 is sometimes known as a transceiver, transceiving device, network interface card (NIC), and the like.

Exemplary Program Detection and Notification

Figure 3:
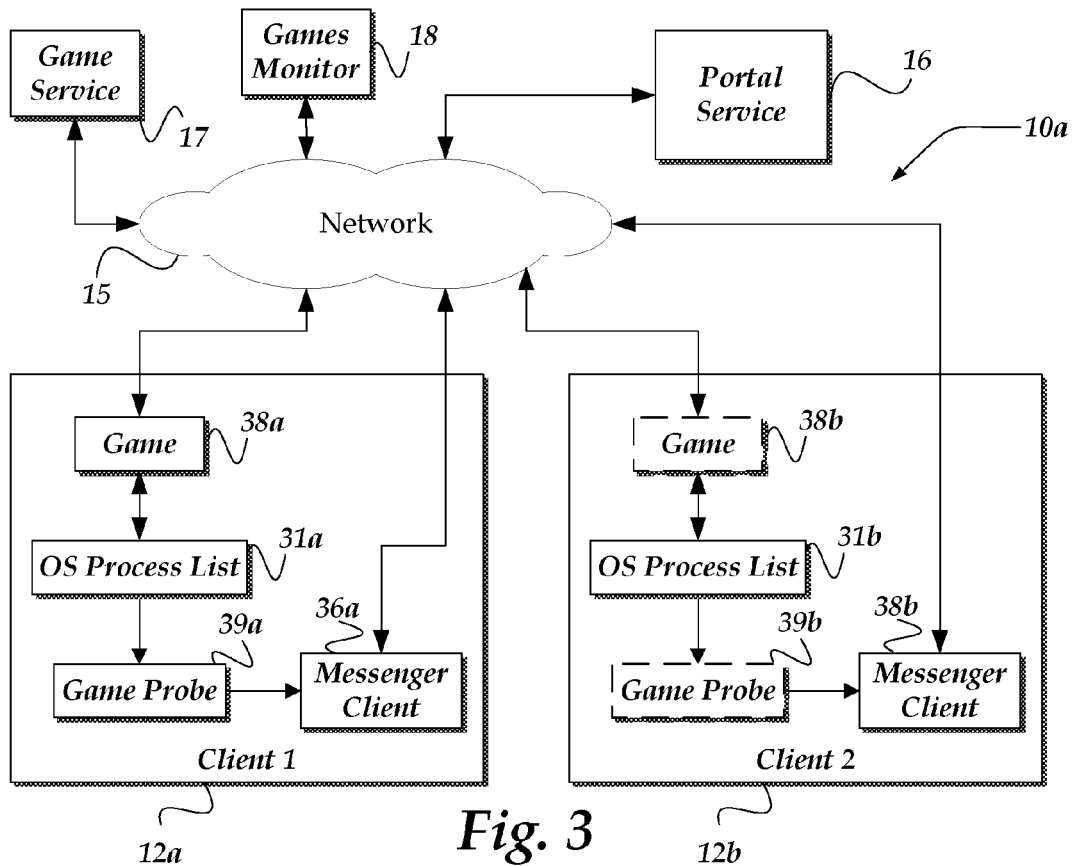
FIG. 3 illustrates one embodiment of an architecture for the present invention.

FIG. 3 illustrates one embodiment of an architecture 10a for the present invention. However, not all of the illustrated modules may be required to practice the invention, and variations in the arrangement and type of the components may be made without departing from the spirit or scope of the invention.

As shown in the figure, a first client 12a includes a game 38a that may communicate through network 15 and interface with game service 17 to participate in an online, multiplayer game. A games monitor 18 also communicates through network 15 with game service 17 and other game services to determine which online games and/or other programs are available. Games monitor 18 may also monitor a changing status of the games and/or other programs. An example, of a games monitor is an All Seeing Eye™ (ASE) server that detects new games, monitors loading on numerous games servers, matches clients for play, and performs other services. In particular, games monitor 18 provides executable process names and status information through network 15 to portal service 16 and/or to clients. Games monitor 18 may provide information services related to a wide variety of games and games providers. Accordingly, games monitor 18 may comprise a collection of monitors that may or may not be directly associated with particular games and/or game services.

While first client 12a executes game 38a as an application program process, the corresponding process name is listed in an operating system process list 31a. A game probe 39a monitors operating system process list 31a to detect when game 38a and/or other predetermined programs are executing. When game probe 39a detects executing game 38a, the game probe instructs a messenger client 36a to inform portal service 16 that first client 12a is participating in the online game. The game probe also instructs the messenger client to request that portal service 16 notify other clients that first client 12a is participating in the online game. The other clients are generally members of a contact list associated with first client 12a. The contact list may comprise contacts in an instant messenger list, an email address book, and/or other collections of communication contacts. First client 12a and/or portal service 16 may store the contact list. Some contacts may be obtained from game service 17, however the contact list is not limited to members of game service 17. Portal service 16 is also generally independent of game service 17, which might be limited to a single game, or a small subset of programs. Although portal service 16 may include one or more game services, portal service 16 need not be directly related to, or controlled by game service 17. Instead, portal service 16 may act as an intermediary between a wide variety of game services, enabling clients to interact beyond the boundaries of an particular game service.

For example, portal service 16 can communicate the notification through network 15 to a messenger client 38b of a second client 12b who may, or may not be a current member of game service 17. The notification can be displayed and/or otherwise provided to a user of second client 12b, who may choose to download and/or execute a game 38b and participate in the online multiplayer game with the user of first client 12a. If the user of second client 12b executes game 38b, the corresponding process name will be added to an operating system process list 31b. If second client 12b includes a game probe 39b, it can instruct messenger client 38b to notify first client 12a and/or other clients that second client 12b is also participating in the online multiplayer game.

Figure 4:
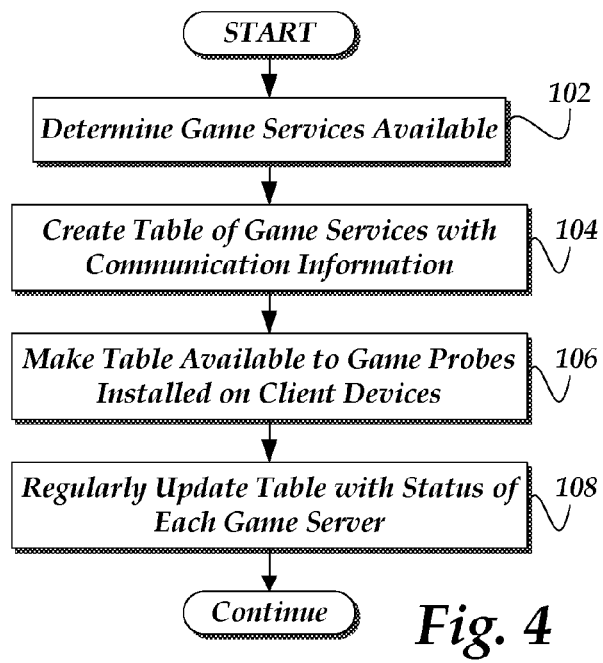
FIG. 4 is a flow diagram illustrating exemplary logic for one embodiment of a games monitor to provide a listing and status of currently available games.

FIG. 4 is a flow diagram illustrating exemplary logic for one embodiment of a games monitor to provide a listing and status of currently available games. At an operation 102, the games monitor determines which games and/or other programs are available from one or more game services and/or other services. The games monitor may obtain information from program publishers, program developers, users, reviewers, and the like. On a periodic basis, such as each day, the games monitor updates a configuration data file (e.g., config. dat), with the name and other information about any new program executable files that have become available. At an operation 104, the games monitor creates a table of game services (and/or other services). The table includes communication information, such as a network address(es), port(s), protocol requirements, and the like. A sample table is illustrated in Table 1 below:

TABLE 1

| Program Name | File Name | Server Address | Port No. | No. of Messages | Time Period | Status |
|---|---|---|---|---|---|---|
| Half Life 2 | HL2.exe | 123.456.789.101 | 80 | 10 | 1 sec. | 98% |
| Half Life 2 | HL2.exe | 963.852.741.951 | 80 | 10 | 1 sec. | 53% |
| Quake 3 | Q3D.exe | 101.987.654.321 | 60 | 20 | 1.5 sec. | 84% |
| Sims | Sims.exe | 147.258.369.741 | 40 | 10 | .5 sec. | 46% |

The table may also include information that the game probe may use to determine whether the game is truly an online game in which other clients can participate. For example, the table may include information on communication traffic that would indicate an executing game is interacting with the online game service. Such information may include a number of messages that typically pass between the game service and the client within a specified time period.

At an operation 106, the games monitor makes the table available to game probes that are installed on clients. Each game probe may check for and download the table upon initiation of the game probe. Alternatively, the games monitor may push the table down to clients that are known to have a game probe installed. At an operation 108, the games monitor regularly updates the table with a current status of each game server. The status information may be used by newly initiated game probes to determine which game server(s) may be better to connect with and/or determine whether sufficient resources are available on a game server on which a friend is playing.

Figure 5:
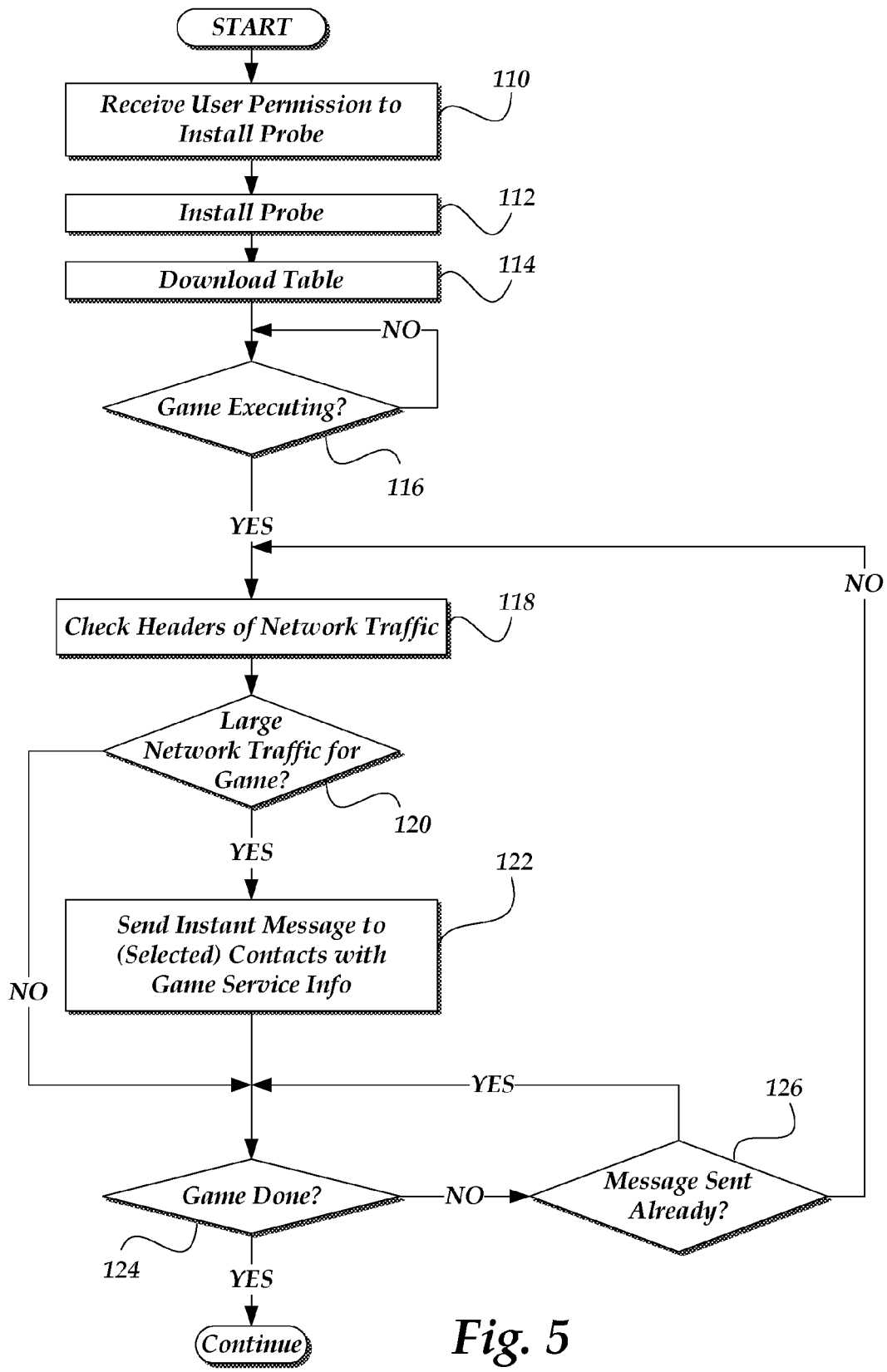
FIG. 5 is a flow diagram illustrating exemplary logic for one embodiment of a game probe to detect execution of a game program and notify another client.

FIG. 5 is a flow diagram illustrating exemplary logic for one embodiment of a game probe to detect execution of a game program and notify another client. At an operation 110, a client device receives permission to install the game probe. Permission may be provided when the client requests the game probe, when the game probe initiates its installation process, and/or at another suitable time. At an operation 112, the game probe is installed on the client device. The game probe contacts the games monitor and downloads the current table of game services at an operation 114.

At a decision operation 116, the game probe monitors the operating system process list for filenames of predefined executable files corresponding to games and/or other application programs that are listed in the table. If the game probe does not detect one the predefined executable files, the game probe continues to monitor the process list. The game probe may wait for predefined or selectable intervals, such as every 15 seconds, to check for any of the predefined executable files. Once the game probe detects a predefined executable file in the process list, the game probe checks headers of communication traffic associated with the predefined executable file, at an operation 118. The game probe may check to see whether most the communication traffic is with the same game server, on the same port, and/or other communication characteristics. At a decision operation 120, the game probe determines whether a large amount of communication traffic is associated with the predefined executable file. For example, the game probe may detect whether a certain number of user datagram protocol (UDP) messages have been exchanged with the same game server within a specific time period. The number of messages and time period are generally provided in the table. However, the threshold number of messages and time period may depend on communication optimizations for each game, game servers, and/or other aspects.

If the communication traffic indicates that the client is communicating with an online game service, the game probe instructs the messenger client to send an instant message to one or more contacts, at an operation 122. The client user may preselect contacts to which a message should be sent and/or predefine other limitations on sending messages related to execution of the predefined program(s). The instant message may include information associated with the game service, so that contacts may communicate with the same game service. This provides an automated way to invite friends to participate in an online game and/or other services. The message may be sent directly to contacts based on information stored on the client. Alternatively, or in addition, the message may be communicated to a portal service which may distribute the message to other clients based on an address book and/or other contact information stored by the portal service. Conversely, if the communication traffic indicates that the client is not communicating with an online game service, but instead may be playing the game only locally, no message is sent.

At a decision operation 124, the game probe detects whether the predefined executable file is still executing as indicated by the process list. If the game is still executing, the game probe determines, at a decision operation 126, whether a message has already been sent. If a message has already been sent, the game probe continues to monitor the process list to detect delisting of the predefined executable file. However, if a message was not previously sent control returns to operation 118 to continue to monitor communication traffic related to the predefined executable file. If the game has ended, the predefined executable file will no longer be listed, and the game probe can return to detecting and/or monitoring any other predefined executable files.

Figure 6:
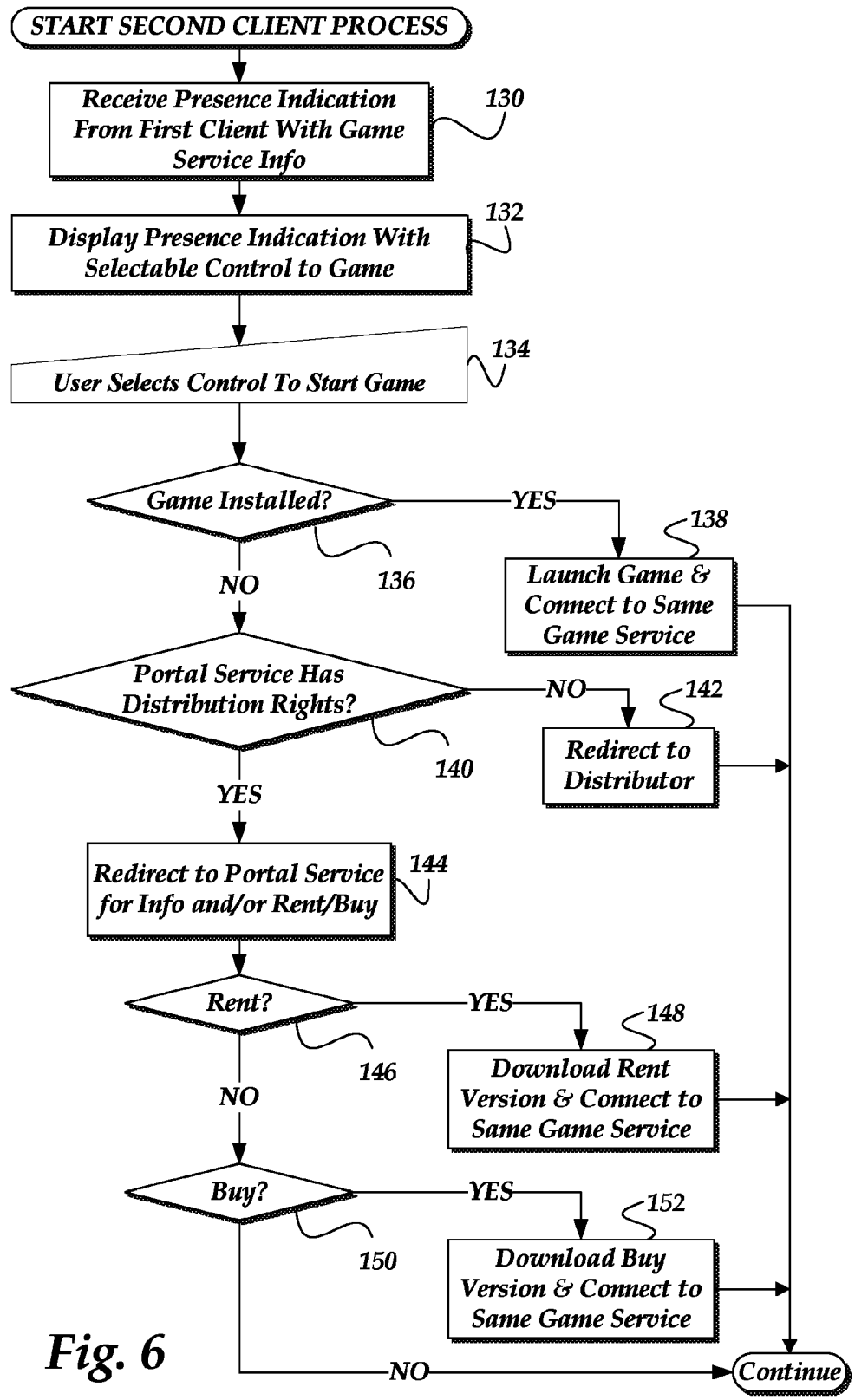
FIG. 6 is a flow diagram illustrating exemplary logic of a second client device for accessing the client game program (or other client service) and interacting with the online game (or other online service).

FIG. 6 is a flow diagram illustrating exemplary logic of a second client device for accessing the client game program (or other client service) and interacting with the online game (or other online service). At an operation 130, the second client device receives the message that the first client device is engaged in the online service. The message includes address information needed for the second client device to communicate with the same online game service. The message may come in the form of a presence indication through a messaging service, such as an instant message service, running on second client device. For example, the messaging service may provide an audio tone and/or a visual icon indicating that the first client is online. The audio tone and/or visual icon may also include an identifier of the online service with which the first client is interacting. The identifier is displayed at an operation 132 with a selectable control (e.g., a button, text, a link, etc.) that enables a user to initiate the game being played by the first client. At an operation 134, the user selects the control to initiate the game.

At a decision operation 136, the messaging service of the second client determines whether the same game program is installed on the second client device. If the same game program is already installed on the second client device, the second client device launches the game program at an operation 138. The game program then uses the address information to connect to the same online game service as the first client.

However, if the game program is not already installed, the second client device determines at a decision operation 140 whether the online portal service has distribution rights for the game program. This determination may be made with the above table or other data that may be stored by the messaging service on the second client device and/or that may be accessible from the online portal service. If the online portal service does not have distribution rights, the second client device may be redirected to a distributor of the game program at an operation 142. Conversely, if the online portal service does have distribution rights, the second client device is directed to a portion of the online portal service at an operation 144 that provides information about the game program and/or enables the second client device to access the game program. The information may include a status of the first client, such as a current state in the online game (whether in need of help from friends), an indication of whether the first client is available for voice chat, and/or other information.

The information from the online portal service may also provide options for freely trying, renting, or purchasing the game program. The information and/or options may be provided through a web page, through the messaging service, and/or other service. At a decision operation 146, the second client device determines whether the user has selected to rent the game program. If the user chooses to rent, the online portal service may download a trial version of the game program that may expire and/or have limited capabilities and an operation 148. However, the trial version will generally still include the ability to communicate with the online game service. Accordingly, the downloaded trial version of the game program may use the address information to connect to second client device to the same online game session as the first client device.

Alternatively, if the user does not choose to rent the game program, the second client device determines at a decision operation 150, whether the user has selected to purchase the game program. If the user chooses to purchase, the online portal service downloads a permanent or subscription version of the game program and an operation 152. The permanent or subscription version of the game program may also use the address information to connect to second client device to the same online game session as the first client device. If the user chooses not to rent or buy, the user may be given an option for free trial, may be given information on other game programs, may be redirected to another area of the online portal service, or provided other information.

The above specification, examples, and data provide a complete description of the manufacture and use of the composition of the invention. However other embodiments will be clear to one skilled in the art. For example, the client probe may detect any type of predetermined process being executed on a client, besides games, and notify other clients. Since many embodiments of the invention can be made without departing from the spirit and scope of the invention, the invention resides in the claims hereinafter appended.

What is claimed as new and desired to be protected by Letters Patent is:

1. A network device for detecting participation in an on-line service, comprising:
   a communication interface for providing communication with the on-line service and at least one other network device;
   a memory configured for storing processing instructions; and
   a processor in communication with the communication interface and the memory, wherein the processor performs actions based at least in part on the stored instructions, including:
      dynamically updating a communication information table on the network device, wherein the communication information table includes a plurality of communication characteristics for at least one client program including at least a plurality of parameters and related thresholds that correspond to the at least one client program;
      monitoring executable files to detect that a client program of the at least one client program in the communication information table is executing on the network device;
      determining that the detected client program is interacting with the on-line service over a network by utilizing the plurality of communication characteristics that correspond to the detected client program, such that the determination is based at least in part on a number of a plurality of messages exchanged between the detected client program and the on-line service exceeding a corresponding predefined threshold within a corresponding predefined time period, wherein the determining is performed by a game probe that is separate from the detected client program and the on-line service; and
      sending an invitation to participate in the on-line service as a short message service (SMS) message to the at least one other network device in response to determining that the detected client program is interacting with the on-line service.

2. The network device of claim 1, wherein the invitation to participate in the on-line service includes text that identifies a link to the on-line service for display of content associated with the on-line service.

3. The network device of claim 1, wherein the processor actions further include:
   receiving a client identifier from a user of the detected client program; and
   sending the SMS message to the at least one other network device based on addressing information associated with the client identifier.

4. The network device of claim 1, wherein the processor actions further include detecting that another SMS message has been received, and wherein the other SMS message includes a request that the SMS message is to be sent to the at least one other network device.

5. The network device of claim 1, wherein the processor actions further include detecting that another SMS message has been received, and wherein the other SMS message includes at least one contact identifier for addressing the SMS message to the at least one another network device.

6. The network device of claim 1, wherein the memory is further configured for storing a contact list such that at least one contact identifier is identified in another SMS message by a selection of the least one contact identifier from among other contact identifiers of the contact list.

7. The network device of claim 1, wherein the on-line service includes a game service.

8. A non-transitory computer-readable storage medium, comprising executable instructions for performing actions, including:
dynamically updating a communication information table on a client device, wherein the communication information table includes a plurality of communication characteristics for at least one client program including at least a plurality of parameters and related thresholds that correspond to the at least one client program;
monitoring executable files to detect that a client program of the at least one client program in the communication information table is executing on the client device;
determining that the detected client program is participating in an on-line service over a network by utilizing the plurality of communication characteristics that correspond to the detected client program, such that the determination is based at least in part on a number of a plurality of messages exchanged between the detected client program and the on-line service exceeding a corresponding predefined threshold within a corresponding predefined time period, wherein the determining is performed by a game probe that is executing on the client device and is separate from the detected client program and the on-line service; and
sending an invitation to participate in the on-line service as a short message service (SMS) message to another client device in response to determining that the detected client program is participating in the on-line service.

9. The non-transitory computer-readable storage medium of claim 8, wherein performing actions further includes identifying at least one contact identifier associated with a user of the client device, and wherein sending the invitation further includes addressing the invitation based at least in part on the least one contact identifier.

10. The non-transitory computer-readable storage medium of claim 8, wherein performing actions further includes identifying at least one contact identifier from a contact list associated with a user of the client device.

11. The non-transitory computer-readable storage medium of claim 8, wherein the invitation to participate in the on-line service includes text that identifies a link to the on-line service for display of content associated with the on-line service.

12. The non-transitory computer-readable storage medium of claim 8, wherein determining that the detected client program is participating in the on-line service includes:
detecting execution of the detected client program; and
determining that communication between the detected client program and the on-line service exceeds a predefined threshold indicating that the detected client program is participating in the on-line service.

13. The non-transitory computer-readable storage medium of claim 8, wherein determining that the detected client program is participating in the on-line service includes:
evaluating a header of each communication from the detected client program to determine that the communication is between the detected client program and a same on-line service address; and
determining that a rate of communication between the detected client program and the same on-line service address exceeds a threshold number within a predefined period.

14. The non-transitory computer-readable storage medium of claim 8, wherein the on-line service includes a game service.

15. A client device for detecting participation in an on-line service, comprising:
a communication interface for providing communication with the on-line service and a network device;
a memory configured for storing processing instructions; and
a processor in communication with the communication interface and the memory, wherein the processor performs actions based at least in part on the stored instructions, including:
dynamically updating a communication information table on the client device, wherein the communication information table includes a plurality of communication characteristics for at least one client program including at least a plurality of parameters and related thresholds that correspond to the at least one client program;
detecting execution of a client program of the at lest one client program in the communication information table that is associated with the on-line service;
determining, by utilizing the plurality of communication characteristics that correspond to the detected client program, that a number of a plurality of messages exchanged between the detected client program and the on-line service within a corresponding predefined time period exceeds a corresponding predefined threshold indicating that the detected client program is participating in the on-line service, wherein the determining is performed by a game probe that is separate from the detected client program and the on-line service; and
sending an invitation as a short message service (SMS) message to the network device in response to determining that the communication between the detected client program and the on-line service exceeds the corresponding predefined threshold.

16. The client device of claim 15, wherein the SMS message includes a request to invite one or more users to participate in the on-line service.

17. The client device of claim 15, wherein the processor actions further include:
receiving an input from a user of the client device that identifies at least one client identifier; and
providing the at least one client identifier in the SMS message.

18. The client device of claim 15, wherein the on-line service includes a game service.

19. A system for detecting participation in an on-line service, comprising:
a processor;
a memory storing instructions that when executed by the processor provide services including:
a communication information table that is dynamically updatable and includes a plurality of communication characteristics for a plurality of client programs including at least a plurality of parameters and related thresholds that correspond each of the plurality of client programs;
an on-line service probe that is configured to perform actions, including determining that a detected client program of the plurality of client programs in the communication information table is participating in the on-line service over a network by utilizing the plurality of communication characteristics that correspond to the detected client program, such that the determination is based at least in part on a number of a plurality of messages exchanged between the detected client program and the on-line service exceeding a corresponding predefined threshold within a corresponding predefined time period; and a messaging service that is configured to perform actions, including:

receiving a communication indicating that the detected client program is participating in the on-line service; and sending a short message service (SMS) message to a client device indicating the detected client program is participating in the on-line service.

20. The system of claim 19, wherein the SMS message includes an invitation to the client device from another client device associated with the detected client program to participate in the on-line service.

21. The system of claim 19, wherein the messaging service actions further include receiving a contact identifier from the other client device for addressing the SMS message to the client device.

22. The system of claim 19, wherein the messaging service actions further include employing a contact identifier associated with a contact list for addressing the SMS message to the client device.

23. The system of claim 19, wherein the on-line service includes a game service and the on-line service probe includes a game probe.

* * * * *

UNITED STATES PATENT AND TRADEMARK OFFICE
CERTIFICATE OF CORRECTION

| | | |
|---|---|---|
| PATENT NO. | : 8,108,515 B2 | Page 1 of 1 |
| APPLICATION NO. | : 12/234532 | |
| DATED | : January 31, 2012 | |
| INVENTOR(S) | : Lee Crawford et al. | |

It is certified that error appears in the above-identified patent and that said Letters Patent is hereby corrected as shown below:

In column 11, line 37, in Claim 9, delete "least" and insert -- at least --, therefor.

In column 12, line 18, in Claim 15, delete "lest" and insert -- least --, therefor.

Signed and Sealed this
Twenty-fourth Day of April, 2012

David J. Kappos
*Director of the United States Patent and Trademark Office*